(12) United States Patent
Ishigami et al.

(10) Patent No.: US 8,955,554 B2
(45) Date of Patent: Feb. 17, 2015

(54) SUBMERGED ARC WELDING METHOD FOR STEEL PLATE

(75) Inventors: Atsushi Ishigami, Chiba (JP); Kenji Oi, Chiyodu-ku (JP); Naoya Hayakawa, Chiba (JP)

(73) Assignee: JFE Steel Corporation, Tokyo (JP)

( * ) Notice: Subject to any disclaimer, the term of this patent is extended or adjusted under 35 U.S.C. 154(b) by 698 days.

(21) Appl. No.: 13/321,970

(22) PCT Filed: Sep. 4, 2009

(86) PCT No.: PCT/JP2009/065883
§ 371 (c)(1),
(2), (4) Date: Feb. 1, 2012

(87) PCT Pub. No.: WO2010/137186
PCT Pub. Date: Dec. 2, 2010

(65) Prior Publication Data
US 2012/0325362 A1  Dec. 27, 2012

(30) Foreign Application Priority Data

May 27, 2009 (JP) .................................. 2009-127170
May 27, 2009 (JP) .................................. 2009-127171

(51) Int. Cl.
*F16L 9/00* (2006.01)
*B23K 9/18* (2006.01)
(Continued)

(52) U.S. Cl.
CPC .................. *B23K 9/18* (2013.01); *B23K 9/0253* (2013.01); *B23K 33/006* (2013.01); *B23K 2201/06* (2013.01); *B23K 2201/10* (2013.01); *B23K 2203/04* (2013.01)

USPC ........ 138/171; 228/262.1; 228/144; 228/147; 228/150; 228/151

(58) Field of Classification Search
USPC ........ 138/171; 228/262.1, 144, 147, 150, 151
See application file for complete search history.

(56) References Cited

U.S. PATENT DOCUMENTS 4,751,366 A * 6/1988 Trosken et al. ........... 219/137 R
4,816,640 A * 3/1989 Sugitani et al. ......... 219/137 PS
(Continued)

FOREIGN PATENT DOCUMENTS

JP  54-122670 A  9/1979
JP  59-66978 A   4/1984
(Continued)

OTHER PUBLICATIONS

International Search Report dated Dec. 22, 2009, application No. PCT/JP2009/065883.

*Primary Examiner* — James Hook
(74) *Attorney, Agent, or Firm* — RatnerPrestia

(57) ABSTRACT

Provided is a submerged arc welding method for a steel plate. In welding the steel plate from an internal surface or an external surface by a submerged arc welding, welding condition is set such that, a cross-sectional area of internal weld metal $S_1$ and a cross-sectional area of external weld metal $S_2$ satisfy the formula (1), the formula (2), and the formula (3), that is, $0.40 \leq (S_1+S_2)/t^2 \leq 0.80$ ... (1), $S_1/t^2 \leq 0.35$ ... (2), and $S_2/t^2 \leq 0.45$ ... (3), wherein t is a plate thickness of the steel plate (mm), $S_1$ is a cross-sectional area of the internal weld metal (mm$^2$) excluding the cross-sectional area of a portion of the internal weld metal overlapping with the external weld metal after external welding, and $S_2$ is a cross-sectional area of the external weld metal (mm$^2$).

7 Claims, 2 Drawing Sheets

(51) Int. Cl.
  *B23K 9/025* (2006.01)
  *B23K 33/00* (2006.01)

(56) References Cited

U.S. PATENT DOCUMENTS

| | | | |
|---|---|---|---|
| 5,494,209 A * | 2/1996 | Randlett et al. | 228/147 |
| 5,730,189 A * | 3/1998 | Randlett et al. | 138/171 |
| 6,379,821 B2 * | 4/2002 | Kushida et al. | 428/685 |
| 6,782,921 B1 * | 8/2004 | Tsuru et al. | 138/142 |
| 7,874,471 B2 * | 1/2011 | Fairchild et al. | 228/112.1 |
| 8,039,118 B2 * | 10/2011 | Hara et al. | 428/683 |
| 8,084,144 B2 * | 12/2011 | Hara et al. | 428/683 |
| 2013/0037162 A1 * | 2/2013 | Shinohara et al. | 138/171 |

FOREIGN PATENT DOCUMENTS

| | | |
|---|---|---|
| JP | 7-75876 A | 3/1995 |
| JP | 10-109171 | 4/1998 |
| JP | 11-138266 | 5/1999 |
| JP | 2006-272377 | 10/2006 |

* cited by examiner

SUBMERGED ARC WELDING METHOD FOR STEEL PLATE

CROSS-REFERENCE TO RELATED APPLICATIONS

This application is the U.S. National Phase application of PCT International Application No. PCT/JP2009/065883, filed Sep. 4, 2009, and claims priority to Japanese Patent Application No. 2009-127170, filed May 27, 2009, and Japanese Patent Application No. 2009-127171, filed May 27, 2009, the disclosures of which PCT and priority applications are incorporated herein by reference in their entirely for all purposes.

FIELD OF THE INVENTION

The present invention relates to a submerged arc welding method for a steel plate, and more particularly to a submerged arc welding method for a steel plate preferably used in welding at the time of making a large diameter steel pipe such as a UOE steel pipe or a spiral steel pipe.

BACKGROUND OF THE INVENTION

In performing welding (seam welding) at the time of making a large diameter steel pipe, submerged arc welding with two or more electrodes is used. From a viewpoint of enhancing production efficiency of steel pipes, highly efficient welding work has been performed. That is, double one layer welding where an internal side is welded by 1 pass and an external side is welded by 1 pass has been carried out (patent documents 1, 2, for example).

In double one layer welding, an internal weld metal and an external weld metal overlap with each other and hence, it is necessary to secure a sufficient penetration depth (or depth of fusion) so as to eliminate an unmelted part, whereby welding is performed by applying a large-current of 1000 A or more in general. However, since an emphasis is placed on the enhancement of welding efficiency and the suppression of defects, a welding heat input becomes excessively high, thus giving rise to a tendency that the toughness of a weld, particularly, the toughness of a welded heat affected zone is deteriorated.

Although the reduction of welding heat input is effective to increase the toughness of a weld, unless a heat input in seam welding is largely reduced compared to a heat input usually carried out, a clear toughness enhancement effect cannot be acquired, and when a heat input is largely reduced, an amount of deposit metal is also reduced so that it is necessary to reduce a cross-sectional area of groove by an amount corresponding to the reduction of the deposit metal. Accordingly, the internal and external weld metals do not overlap with each other unless further deeper penetration welding is performed, thus increasing a possibility that a lack of penetration occurs.

Accordingly, to increase the toughness of the weld, both the large reduction of a heat input supply and the increase of a penetration depth are necessary however, the achievement of which is extremely difficult, although various proposals have conventionally been made.

For example, the above-mentioned patent document 2 proposes a submerged arc welding method where a penetration depth is increased by increasing current density corresponding to an electrode diameter. However, an electric current and current density are insufficient for the latest specification and hence, it is difficult to realize both the large reduction of a heat input and the increase of a penetration depth.

Patent document 3 proposes a submerged arc welding method with a high electric current and with a much higher current density. Here, an attempt is made to realize both the reduction of heat input and the deep penetration, by supplying an arc energy in the plate thickness direction as much as possible so as to ensure the depth of infusion by a required amount thus suppressing melting of a base material in the widthwise direction whereby an excessive welding heat input is eliminated.

PATENT DOCUMENTS

[Patent document 1] JP-A-11-138266
[Patent document 2] JP-A-10-109171
[Patent document 3] JP-A-2006-272377

SUMMARY OF THE INVENTION

Although the submerged arc welding method described in patent document 3 can realize both the reduction of heat input and the deep penetration, a bead width on a surface of a steel plate becomes small so that the bead width is liable to become approximately uniform from the surface of the steel plate to a tip of penetration. That is, a fusion line (hereinafter referred to as FL) is formed in a bead shape substantially perpendicular to the surface of the steel plate and hence, a brittle fracture in the plate thickness direction is liable to progress thus giving rise to a drawback that a toughness value is liable to be lowered in spite of low heat input welding.

Further, such a bead shape is also liable to cause a welding defect due to slag inclusion.

The present invention provides a submerged arc welding method for a steel plate which can obtain excellent toughness in a welded heat affected zone on both the internal and external surfaces thereof while obtaining a sufficient penetration with a low heat input at the time of welding the steel plate from the internal and external surfaces by submerged arc welding.

The gist of the present invention, according to exemplary embodiments, is as follows.

[1] A submerged arc welding method for a steel plate characterized in that in performing internal-and-external one layer welding on a steel plate by submerged arc welding, a sum of a cross-sectional area of internal weld metal $S_1$ and a cross-sectional area of external weld metal $S_2$ satisfies the formula (1), the cross-sectional area of the internal weld metal $S_1$ satisfies the formula (2), and the cross-sectional area of the external weld metal $S_2$ satisfies the formula (3);

$$0.40 \leq (S_1+S_2)/t^2 \leq 0.80 \quad (1)$$

$$S_1/t^2 \leq 0.35 \quad (2)$$

$$S_2/t^2 \leq 0.45 \quad (3),$$

wherein t: a plate thickness of the steel plate (mm), $S_1$: a cross-sectional area of the internal weld metal (mm$^2$) excluding a cross-sectional area of a portion to be overlapped with the external weld metal after external welding, and $S_2$: a cross-sectional area of the external weld metal (mm$^2$).

[2] In the submerged arc welding method for a steel plate described in the above-mentioned [1], in both the internal welding and the external welding, a bead width measured on a surface of the steel plate satisfies the formula (4), and a bead width measured at a depth of 0.4 t from the surface of the steel plate satisfies the formula (5);

$$0.60 \leq W_1/t \leq 0.95 \quad (4),$$

wherein t: the plate thickness (mm), $W_1$: a bead width measured on the surfaces of the steel plate on the internal welding side and the external welding side (mm), $$W_2/t \leq 0.45 \qquad (5),$$

wherein, t: the plate thickness (mm), $W_2$: a bead width measured at a position of 0.4 t in the plate thickness direction from the surfaces of the steel plate on the internal welding side and the external welding side (mm).

[3] A weld joint manufactured by the welding method described in the above-mentioned [1] or [2].

[4] A submerged arc welding method for a steel plate which performs internal-and-external one layer welding on a steel plate, wherein in both internal welding and external welding, a bead width measured on a surface of the steel plate satisfies the formula (4), and a bead width measured at a depth of 0.4 t from the surface of the steel plate satisfies the formula (5);

$$0.60 \leq W_1/t \leq 0.95 \qquad (4),$$

wherein t: a plate thickness (mm), $W_1$: a bead width measured on the surfaces of the steel plate on the internal welding side and the external welding side (mm), $$W_2/t \leq 0.45 \qquad (5),$$

wherein t: a plate thickness (mm), $W_2$: a bead width measured at a position of 0.4 t in the plate thickness direction from the surfaces of the steel plate on the internal welding side and the external welding side (mm).

[5] A weld joint manufactured by the welding method described in the above-mentioned [4].

According to the present invention, it is possible to acquire a weld joint with no welding defect which possesses excellent toughness in a welded heat affected zone on both internal and external surfaces of a steel plate while acquiring a sufficient penetration corresponding to a plate thickness of the steel plate and hence, the present invention is extremely useful industrially.

DETAILED DESCRIPTION OF THE INVENTION

Figure 1:
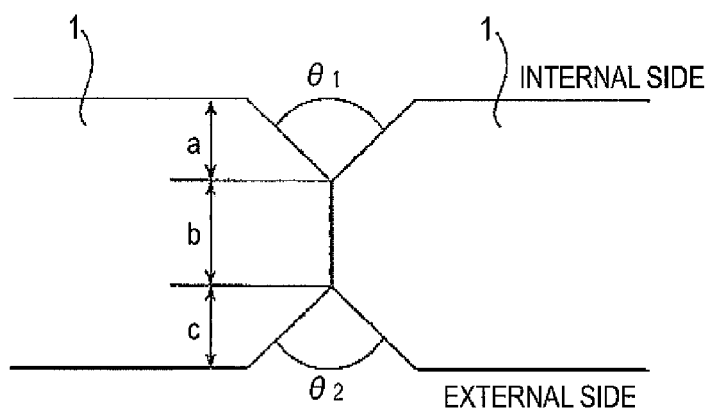
FIG. 1 is a view for explaining shapes of grooves in embodiments 1 and 2.

Inventors of the present invention prepared weld joints on internal and external surfaces of steel plates under various welding conditions by submerged arc welding, and investigated cross-sectional shapes of weld metals, cross-sectional areas of weld metals, and the toughness of welded heat affected zones.

As a result of the investigation, the inventors have made a finding that by properly controlling the cross-sectional areas of internal weld metal and external weld metal corresponding to a plate thickness, a bead width on a surface of the steel plate can be increased while acquiring a sufficient penetration and hence, excellent toughness can be acquired in the welded heat affected zone on both internal and external surfaces of the steel plate. The present invention has been made by making further studies based on the acquired finding.

In an embodiment of the submerged arc welding method for a steel plate according to the present invention, in welding an internal side and an external side of the steel plate, a welding condition is selected such that a sum of the cross-sectional area of internal weld metal $S_1$ and the cross-sectional area of external weld metal $S_2$ satisfies the formula (1) so as to prevent the occurrence of lack of penetration;

$$0.40 \leq (S_1+S_2)/t^2 \leq 0.80 \qquad (1),$$

wherein t: a plate thickness of the steel plate (mm), $S_1$: cross-sectional area of the internal weld metal in the cross-sectional macro structure of a weld perpendicular to the welding direction excluding a cross-sectional area of a portion to be overlapped with the external weld metal after external welding (mm²), $S_2$: a cross-sectional area of external weld metal in the cross-sectional macro structure of a weld perpendicular to the welding direction (mm²).

When the sum of the cross-sectional area of the internal weld metal ($S_1$) and the cross-sectional area of the external weld metal ($S_2$) is less than 0.40×t², a penetration depth of internal welding and/or a penetration depth of the external welding are insufficient so that the internal weld metal and the external weld metal do not overlap with each other, whereby a sound weld bead cannot be obtained. The sum of the cross-sectional area of the internal weld metal ($S_1$) and the cross-sectional area of the external weld metal ($S_2$) preferably falls within a range of (0.40 to 0.60)×t².

Further, the welding condition is selected such that the cross-sectional area of the internal weld metal ($S_1$) and the cross-sectional area of the external weld metal ($S_2$) satisfy the formula (2) and the formula (3) so as to prevent a welding heat input from becoming excessively large;

$$S_1/t^2 \leq 0.35 \qquad (2)$$

$$S_2/t^2 \leq 0.45 \qquad (3).$$

When the cross-sectional area of the internal weld metal ($S_1$) exceeds 0.35×t², the welding heat input in internal welding becomes excessively large, thus giving rise to a drawback that the toughness of a welded heat affected zone is deteriorated. A preferred range of $S_1/t^2$ is 0.20 to 0.30. A sum of the cross-sectional area of the internal weld metal ($S_1$) and the cross-sectional area of the external weld metal ($S_2$) becomes 0.80×t² or less from the formula (2) and the formula (3).

In the same manner, when the cross-sectional area of the external weld metal $S_2$ exceeds 0.45×t², the welding heat input becomes excessively large in external welding, thus giving rise to a drawback that the toughness of the welded heat affected zone is deteriorated. A preferable range of $S_2/t^2$ is 0.25 to 0.40.

In carrying out embodiments of the present invention, preliminarily, weldings are performed on specimens having the same plate thickness as that of a plate for a actual welding under various conditions to obtain the relationship between a heat input and cross-sectional area of weld metal, and a welding condition where $S_1$ and $S_2$ satisfy the formula (1), the formula (2) and the formula (3) is selected. It is desirable that a welding condition of high current density is applied to a preceding electrode such that the internal weld metal and the external weld metal overlap with each other.

Preferred toughness of the welded heat affected zone according to the present invention is 50 J or more in terms of absorbed energy (average value) when a Charpy impact test (location of notch: FL, test temperature: −30° C., the number of tests: 3) is carried out. The toughness of welded heat affected zone is more preferably 90 J or more.

Further, the present invention provides a weld joint which is manufactured by the above-mentioned welding method.

Figure 2:
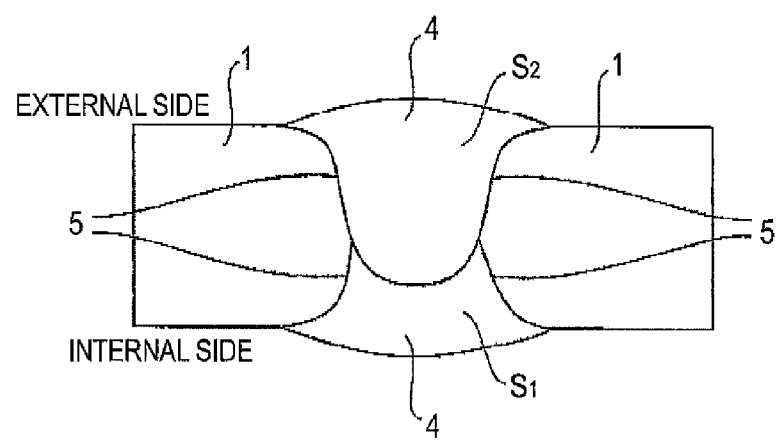
FIG. 2 is a view for explaining a cross-sectional area of internal weld metal ($S_1$) and a cross-sectional area of external weld metal ($S_2$) according to the embodiments 1 and 2.

In embodiments of the present invention, the cross-sectional area of the internal weld metal ($S_1$) is defined as follows. Although external welding is carried out after carrying out internal welding, as shown in FIG. 2, a part of the internal weld metal is remelted at the time of external welding and hence, it is impossible to directly measure a cross-sectional area of weld metal formed by internal welding. Accordingly, an area of a portion of the internal weld metal excluding a portion of the internal weld overlapping with the external weld metal is measured, and this measured area is set as a cross-sectional area of the internal weld metal ($S_1$).

Further, in addition to the above-mentioned steps, inventors of the present invention prepared an internal and external weld joint for a steel plate under various welding conditions by submerged arc welding of a steel plate, studied the relationship between a bead shape and the toughness of a welded heat affected zone, and found that by controlling a ratio between a bead width measured on a surface of the steel plate and also a bead width in the vicinity of a distal end of penetration (a position of a depth of 0.4 t from a surface of the steel plate) and a plate thickness of the steel plate within a proper range, an excellent Charpy impact test result (location of notch: FL (fusion line)) can be obtained while suppressing slag inclusion.

In embodiments of the submerged arc welding method for a steel plate according to the present invention, in welding the steel plate by internal and external one layer welding, in both internal welding and external welding, a welding condition is selected such that the relationship between the plate thickness and the bead width measured on the surface of the steel plate satisfies the formula (4).

$$0.60 \le W_1/t \le 0.95 \quad (4),$$

wherein, t: a plate thickness (mm), $W_1$: a bead width measured on surfaces of the steel plate on an internal welding side and an external welding side (mm).

When the relationship between the plate thickness t and the bead width $W_1$ measured on surfaces of the steel plate on the internal welding side and the external welding side satisfies $0.60 \le W_1/t \le 0.95$, slag inclusion can be suppressed so that a sound weld can be obtained.

In the weld bead where the relationship between the bead width $W_1$ and the plate thickness t becomes $W_1/t > 0.95$, a quantity of heat applied to a base material is inevitably increased and hence, the toughness of the welded heat affected zone is deteriorated.

On the other hand, in the weld bead where the relationship between the bead width $W_1$ and the plate thickness t becomes $0.60 > W_1/t$, the bead width becomes approximately uniform from the surface of the steel plate to the distal end of penetration and hence, FL takes a fusion shape substantially perpendicular to the surface of the steel plate, whereby a brittle fracture in the plate thickness direction is liable to progress thus lowering a toughness value. Further, a welding defect attributed to slag inclusion is liable to occur. A preferred range of $W_1/t$ is 0.65 to 0.90.

Accordingly, a welding condition is selected so as to satisfy the formula (5) in addition to the condition stipulated in the formula (4), thus inclining FL at a predetermined angle or more with respect to the plate thickness direction of the steel plate.

$$W_2/t \le 0.45 \quad (5)$$

In the formula (5), the bead width $W_2$ measured at the position of depth of 0.4 t from the surface of the steel plate where the above-mentioned bead width $W_1$ is measured is set such that $W_2/t$ becomes 0.45 or less and hence, the bead width at a plate thickness center portion becomes narrower than the bead width at the surface of the steel plate. A preferable range of $W_2/t$ is 0.20 to 0.40.

In carrying out embodiments of the present invention, preliminarily, weldings are performed on specimens having the same plate thickness as that of the steel plate of actual welding under various conditions to obtain the relationship between a heat input and a shape of fusion, and a welding condition where $W_1$ and $W_2$ satisfy the formula (4) and the formula (5) is selected. It is desirable that a welding condition of high current density is applied to a preceding electrode such that the internal weld metal and the external weld metal overlap with each other.

Further, the present invention provides a weld joint manufactured by the above-mentioned welding method.

[Embodiment 1]

Groove machining having a groove shape shown in FIG. 1 was applied to steel plates 1 for UOE steel pipes having chemical compositions shown in Table 1 and having plate thicknesses 28, 33, and 38.1 mm and, thereafter, multiple-electrode submerged arc welding for internal and external one layer welding was applied to the steel plates 1 under welding conditions shown in Table 3 thus manufacturing weld joints. Table 2 shows groove sizes.

Charpy impact test specimens (No. 4 specimens stipulated in JIS Z 3111) were sampled from the manufactured joints, and subjected to a Charpy impact test (location of notch: FL, test temperature: −30° C.) in accordance with a metal material impact test method stipulated in JIS Z 2242 so as to obtain an absorbed energy (an average value obtained by carrying out the test three times).

Figure 3:
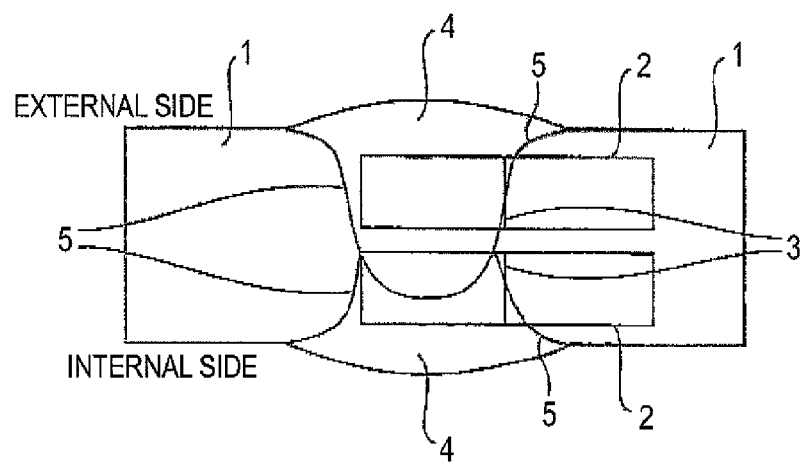
FIG. 3 is a view for explaining positions where Charpy impact test specimens are sampled in the embodiments 1 and 2.

FIG. 3 shows positions where the Charpy impact specimens 2 were sampled. Using the FL 5 of the weld 4 as the location of notch, each specimen was sampled such that a notch 3 is arranged parallel to the plate thickness direction, and with respect to internal welding and external welding respectively, a position 7 mm below the surface of the steel plate 1 becomes the center of the Charpy impact specimen 2. Here, the location of notch 3: FL5 was positioned such that a rate between the weld metal and the base material (welded heat affected zone) at a bottom of the notch becomes 50%-50%.

Table 4 shows the result of Charpy impact test (upper stage: an internal side, a lower stage: an external side) and an observation result of cross-sectional shape of the weld metal. In the evaluation shown in Table 4, the specimen which had no defect and whose vE-30 was 90 J or more was given "⊚: extremely good", the specimen which had no defect and whose vE-30 on an internal side and/or external side was 50 J or more and less than 90 J was given "○: good", and the specimen which was defective or had vE-30 of less than 50 J on an internal side or on an external side was given "X: bad".

In examples of the present invention (conditions No. 1 to No. 5), by controlling a cross-sectional area of the weld metal in internal and external one layer welding, a sound weld bead having a sufficient penetration depth was formed and hence, the steel plate could acquire excellent toughness (90 J or more) in the welded heat affected zone. For a reference purpose, measured values of $W_1$t, and $W_2/t$ with respect to a shape of fusion of the weld metal 4 were shown. All of the present invention examples (conditions No. 1 to No. 5) satisfied the formula (4) and the formula (5). $W_1$ and $W_2$ were measured at the measuring positions shown in FIG. 3.

On the other hand, the sum of cross-sectional areas of weld metals in the internal and external one layer welding was small in comparison examples (conditions No. 8 and No. 9) and hence, the comparison examples did not satisfy the formula (1) thus causing lack of penetration.

In the comparison example (condition No. 6), the cross-sectional area of the internal weld metal did not satisfy the formula (2) and hence, the toughness of the internal welded heat affected zone was deteriorated. In the comparison example (condition No. 7), the cross-sectional area of the external weld metal did not satisfy the formula (3) and hence, the toughness of the external welded heat affected zone was deteriorated.

[Embodiment 2]

Groove machining was applied to steel plates having plate thicknesses and compositions shown in Table 1 of the embodiment 1 for forming grooves having groove shapes shown in FIG. 1 and groove sizes shown in Table 2 of the embodiment 1 and, thereafter, 4-electrode submerged arc welding for internal and external one layer welding was applied to the steel plates 1 under welding conditions shown in Table 5, thus manufacturing weld joints.

Charpy impact test specimens (No. 4 specimens stipulated in JIS Z 3111) were sampled from the manufactured joints such that a position 7 mm below the surface of each of the steel plate 1 on an internal welding side or an external welding side becomes the center of the Charpy impact specimen and were subjected to a Charpy impact test (location of notch: FL, test temperature: −30° C., the number of times that the test was carried out: 3) in accordance with a metal material impact test method stipulated in JIS Z 2242, thus obtaining an absorbed energy (an average value). Here, the location of notch 3: FL 5 is positioned such that a rate between weld metal 5 and the base material (welded heat affected zone) at a bottom of the notch becomes 50%-50%.

Figure 4:
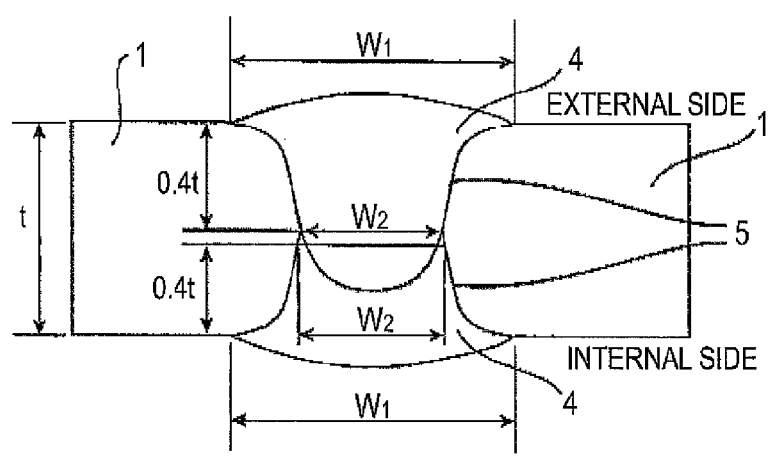
FIG. 4 is a view for explaining bead widths $W_1$ and $W_2$ in the embodiments 1 and 2.

FIG. 4 schematically shows positions where $W_1$, and $W_2$ in the shape of fusion of the weld metal 4 on an external welding side and an internal welding side were measured.

Table 6 shows the shapes of welds, the result of the Charpy impact test and the presence or non-presence of a welding defect. Table 6 also shows a measurement result of the cross-sectional shapes of weld metals $S_1/t^2$, $S_2/t^2$ and $(S_1+S_2)/t^2$. In the evaluation shown in Table 6, the specimen which had no defect and whose vE-30 was 90 J or more was given "◉: extremely good", the specimen which had no defect and whose vE-30 on an internal side and/or external side was 50 J or more and less than 90 J was given "○: good", and the specimen which was defective and had vE-30 of less than 50 J on an internal side or an external side was given "X: bad". The conditions No. 1 to No. 6 are the present invention examples and satisfy the formulae (1) to (3) (cross-sectional areas of weld metals in internal and external one layer welding are controlled) and hence, brought sound weld beads with a sufficient penetration depth. These present invention examples also satisfy the formulae (4) and (5) in both internal and external one layer welding and hence, brought extremely favorable toughnesses (90 J or more) in a welded heat affected zone while bringing sound beads with no welding defect.

On the other hand, although the conditions No. 7 to No. 11 satisfy the formulae (1) to (3), the conditions No. 7 to No. 11 do not satisfy the formula (4) or (5). Accordingly, although the conditions No. 7 to No. 11 are the present invention examples, the conditions No. 7 to No. 11 are inferior to the conditions No. 1 to No. 6 with respect to the toughness of the internal or external welded heat affected zone. To be more specific, the external welding became $W_1/t>0.95$ in the condition No. 7 so that the condition No. 7 did not satisfy the formula (4), and a Charpy impact value of the external welded heat affected zone was low. In the condition No. 8, the external welding became $W_2/t>0.95$ so that the condition No. 8 did not satisfy the formula (5), and a Charpy impact value of the external welded heat affected zone was low.

In the conditions No. 9 and No. 10, the internal welding became $W_1/t<0.60$ so that these conditions No. 9 and No. 10 did not satisfy the formula (4), and a Charpy impact value of the internal welded heat affected zone was low. In the condition No. 11, the external welding became $W_1/t<0.60$ so that the condition did not satisfy the formula (4), and a Charpy impact value of the external welded heat affected zone was low.

The condition No. 12 is a comparison example where the cross-sectional area of the external weld metal did not satisfy the formula (3) and, further, the internal welding became $W_1/t>0.95$ so that condition No. 12 did not satisfy the formula (4) whereby a Charpy impact value of the external welded heat affected zone was low. The condition No. 13 is a comparison example where a sum of a cross-sectional area of the internal weld metal and a cross-sectional area of the external weld metal did not satisfy the formula (1) and, further, the internal welding became $W_1/t<0.60$ so that condition No. 13 did not satisfy the formula (4) whereby a lack of penetration occurred.

DESCRIPTION OF REFERENCE NUMERALS AND SIGNS

1: steel plate for UOE steel pipe
2: Charpy impact test specimen
3: location of notch
4: weld
5. BOND (also referred to as FL)

TABLE 1

| C | Si | Mn | P | S | Cu | Ni | Mo | Nb | plate thickness (mm) | grade |
|---|---|---|---|---|---|---|---|---|---|---|
| 0.04 | 0.16 | 1.57 | 0.011 | 0.002 | 0.02 | 0.01 | 0.16 | 0.03 | 28.0 | APIX60 |
| 0.07 | 0.15 | 1.59 | 0.013 | 0.003 | 0.25 | 0.16 | 0.19 | 0.03 | 33.0 | APIX70 |
| 0.05 | 0.30 | 1.25 | 0.011 | 0.001 | 0.02 | 0.28 | 0.10 | 0.03 | 38.1 | APIX65 |

(mass %)

TABLE 2

| groove symbol | plate thickness (mm) | a (mm) | b (mm) | c (mm) | θ1 (deg) | θ2 (deg) |
|---|---|---|---|---|---|---|
| a | 28.0 | 9.5 | 7.7 | 10.8 | 70 | 70 |
| b | 33.0 | 10.0 | 9.5 | 13.5 | 65 | 65 |
| c | 38.1 | 11.9 | 10.8 | 15.4 | 65 | 65 |

TABLE 3

| condition No | groove symbol | classification | first electrode current (A) | first electrode voltage (V) | first electrode wire diameter (mm) | second electrode current (A) | second electrode voltage (V) | second electrode wire diameter (mm) | third electrode current (A) | third electrode voltage (V) | third electrode wire diameter (mm) | fourth electrode current (A) | fourth electrode voltage (V) | fourth electrode wire diameter (mm) | welding speed (cm/min) | heat input (kJ/mm) |
|---|---|---|---|---|---|---|---|---|---|---|---|---|---|---|---|---|
| 1 | a | internal side | 1200 | 38 | 2.4 | 800 | 40 | 2.4 | 700 | 42 | 3.2 | 600 | 42 | 3.2 | 153 | 5.2 |
|   |   | external side | 1200 | 38 | 2.4 | 800 | 40 | 2.4 | 700 | 42 | 3.2 | 600 | 42 | 3.2 | 125 | 6.3 |
| 2 | b | internal side | 1200 | 38 | 2.4 | 800 | 40 | 2.4 | 700 | 42 | 3.2 | 600 | 42 | 3.2 | 160 | 5.0 |
|   |   | external side | 1200 | 38 | 2.4 | 800 | 40 | 2.4 | 700 | 42 | 3.2 | 600 | 42 | 3.2 | 115 | 6.9 |
| 3 | b | internal side | 1200 | 35 | 2.4 | 800 | 38 | 2.4 | 700 | 40 | 3.2 | 500 | 40 | 3.2 | 165 | 4.4 |
|   |   | external side | 1200 | 35 | 2.4 | 800 | 38 | 2.4 | 700 | 40 | 3.2 | 500 | 40 | 3.2 | 125 | 5.8 |
| 4 | c | internal side | 1200 | 38 | 2.4 | 800 | 40 | 2.4 | 700 | 42 | 3.2 | 600 | 42 | 3.2 | 120 | 6.6 |
|   |   | external side | 1200 | 38 | 2.4 | 800 | 40 | 2.4 | 700 | 42 | 3.2 | 600 | 42 | 3.2 | 80 | 9.9 |
| 5 | c | internal side | 1200 | 38 | 2.4 | 800 | 40 | 2.4 | 700 | 42 | 3.2 | 600 | 42 | 3.2 | 95 | 8.3 |
|   |   | external side | 1200 | 38 | 2.4 | 800 | 40 | 2.4 | 700 | 42 | 3.2 | 600 | 42 | 3.2 | 90 | 8.8 |
| 6 | a | internal side | 1200 | 38 | 2.4 | 800 | 40 | 2.4 | 700 | 45 | 3.2 | 700 | 45 | 3.2 | 130 | 6.5 |
|   |   | external side | 1200 | 38 | 2.4 | 800 | 40 | 2.4 | 700 | 45 | 3.2 | 700 | 45 | 3.2 | 140 | 6.0 |
| 7 | a | internal side | 1200 | 38 | 2.4 | 800 | 40 | 2.4 | 700 | 45 | 3.2 | 700 | 45 | 3.2 | 165 | 5.1 |
|   |   | external side | 1200 | 38 | 2.4 | 800 | 40 | 2.4 | 700 | 45 | 3.2 | 700 | 45 | 3.2 | 115 | 7.3 |
| 8 | b | internal side | 1200 | 38 | 2.4 | 800 | 40 | 2.4 | 700 | 42 | 3.2 | 600 | 42 | 3.2 | 180 | 4.4 |
|   |   | external side | 1200 | 38 | 2.4 | 800 | 40 | 2.4 | 700 | 42 | 3.2 | 600 | 42 | 3.2 | 130 | 6.1 |
| 9 | c | internal side | 1200 | 38 | 2.4 | 800 | 40 | 2.4 | 700 | 42 | 3.2 | 600 | 42 | 3.2 | 150 | 5.3 |
|   |   | external side | 1200 | 38 | 2.4 | 800 | 40 | 2.4 | 700 | 42 | 3.2 | 600 | 42 | 3.2 | 110 | 7.2 |

TABLE 4

| condition No | classification | $S_1/t^2$ | $S_2/t^2$ | $(S_1+S_2)/t^2$ | $W_1/t$ | $W_2/t$ | vE-30 (J) | presence/non-presence of defect | evaluation | classification |
|---|---|---|---|---|---|---|---|---|---|---|
| 1 | internal side | 0.33 | 0.44 | 0.77 | 0.78 | 0.34 | 143 | no defect | ◎: extremely good | present invention example |
|   | external side |   |   |   | 0.88 | 0.36 | 97 |   |   |   |
| 2 | internal side | 0.23 | 0.32 | 0.55 | 0.64 | 0.29 | 210 | no defect | ◎: extremely good | present invention example |
|   | external side |   |   |   | 0.78 | 0.32 | 177 |   |   |   |
| 3 | internal side | 0.18 | 0.24 | 0.42 | 0.60 | 0.28 | 200 | no defect | ◎: extremely good | present invention example |
|   | external side |   |   |   | 0.70 | 0.30 | 161 |   |   |   |
| 4 | internal side | 0.23 | 0.42 | 0.65 | 0.66 | 0.27 | 228 | no defect | ◎: extremely good | present invention example |
|   | external side |   |   |   | 0.86 | 0.32 | 132 |   |   |   |
| 5 | internal side | 0.31 | 0.32 | 0.63 | 0.77 | 0.29 | 177 | no defect | ◎: extremely good | present invention example |
|   | external side |   |   |   | 0.79 | 0.30 | 164 |   |   |   |
| 6 | internal side | 0.36* | 0.38 | 0.74 | 0.89 | 0.37 | 42 | no defect | X: bad | comparison example |
|   | external side |   |   |   | 0.85 | 0.36 | 166 |   |   |   |
| 7 | internal side | 0.29 | 0.46* | 0.75 | 0.77 | 0.34 | 145 | no defect | X: bad | comparison example |
|   | external side |   |   |   | 0.96** | 0.38 | 31 |   |   |   |
| 8 | internal side | 0.16 | 0.22 | 0.38* | 0.61 | 0.28 | 202 | lack of penetration | X: bad | comparison example |
|   | external side |   |   |   | 0.73 | 0.30 | 151 |   |   |   |
| 9 | internal side | 0.16 | 0.22 | 0.38* | 0.58** | 0.25 | 230 | lack of penetration | X: bad | comparison example |
|   | external side |   |   |   | 0.70 | 0.28 | 197 |   |   |   |

Note 1:
symbol * indicating outside the scope of the present invention
symbol ** indicating outside the scope of the present invention Note 2:
$W_1$: bead width measured on surface of steel plate (mm)
$W_2$: bead width measured at depth of 0.4t (t: plate thickness) in plate thickness direction from surface of steel plate (mm)

Note 3:
vE-30 (J): upper stage: test value of internal side, lower stage: test value of external side (average value of three tests) Test condition: test temperature: −30° C., location of notch: Fusion Line Note 4:
evaluation: ◎: extremely good, ○: good, X: bad

TABLE 5

| condition No | groove symbol | classification | first electrode current (A) | first electrode voltage (V) | first electrode wire diameter (mm) | second electrode current (A) | second electrode voltage (V) | second electrode wire diameter (mm) | third electrode current (A) | third electrode voltage (V) | third electrode wire diameter (mm) | fourth electrode current (A) | fourth electrode voltage (V) | fourth electrode wire diameter (mm) | welding speed (cm/min) | heat input (kJ/mm) |
|---|---|---|---|---|---|---|---|---|---|---|---|---|---|---|---|---|
| 1 | a | internal side | 1200 | 38 | 2.4 | 800 | 42 | 2.4 | 700 | 45 | 3.2 | 600 | 45 | 3.2 | 155 | 5.3 |
|   |   | external side | 1200 | 38 | 2.4 | 800 | 42 | 2.4 | 700 | 45 | 3.2 | 600 | 45 | 3.2 | 125 | 6.6 |
| 2 | a | internal side | 1200 | 35 | 2.4 | 1000 | 40 | 2.4 | 700 | 42 | 3.2 | 600 | 42 | 3.2 | 150 | 5.5 |
|   |   | external side | 1200 | 35 | 2.4 | 1000 | 40 | 2.4 | 700 | 42 | 3.2 | 600 | 42 | 3.2 | 135 | 6.1 |
| 3 | b | internal side | 1250 | 35 | 2.4 | 800 | 38 | 2.4 | 700 | 40 | 3.2 | 500 | 40 | 3.2 | 150 | 4.9 |
|   |   | external side | 1200 | 35 | 2.4 | 800 | 40 | 2.4 | 700 | 42 | 3.2 | 600 | 42 | 3.2 | 110 | 7.0 |

TABLE 5-continued

| condition No | groove symbol | classification | first electrode current (A) | first electrode voltage (V) | first electrode wire diameter (mm) | second electrode current (A) | second electrode voltage (V) | second electrode wire diameter (mm) | third electrode current (A) | third electrode voltage (V) | third electrode wire diameter (mm) | fourth electrode current (A) | fourth electrode voltage (V) | fourth electrode wire diameter (mm) | welding speed (cm/min) | heat input (kJ/mm) |
|---|---|---|---|---|---|---|---|---|---|---|---|---|---|---|---|---|
| 4 | b | internal side | 1200 | 35 | 2.4 | 800 | 40 | 2.4 | 700 | 42 | 3.2 | 600 | 42 | 3.2 | 145 | 5.3 |
|   |   | external side | 1200 | 38 | 2.4 | 800 | 40 | 2.4 | 700 | 42 | 3.2 | 600 | 42 | 3.2 | 110 | 7.2 |
| 5 | c | internal side | 1250 | 35 | 2.4 | 800 | 40 | 2.4 | 700 | 42 | 3.2 | 600 | 42 | 3.2 | 130 | 6.0 |
|   |   | external side | 1250 | 35 | 2.4 | 800 | 40 | 2.4 | 700 | 42 | 3.2 | 600 | 42 | 3.2 | 95 | 8.2 |
| 6 | c | internal side | 1250 | 35 | 2.4 | 800 | 40 | 2.4 | 700 | 42 | 3.2 | 600 | 42 | 3.2 | 120 | 6.5 |
|   |   | external side | 1200 | 38 | 2.4 | 800 | 40 | 2.4 | 700 | 42 | 3.2 | 600 | 42 | 3.2 | 120 | 6.6 |
| 7 | a | internal side | 1200 | 38 | 2.4 | 800 | 40 | 2.4 | 700 | 42 | 3.2 | 600 | 42 | 3.2 | 170 | 4.7 |
|   |   | external side | 1200 | 38 | 2.4 | 800 | 42 | 2.4 | 700 | 45 | 3.2 | 600 | 45 | 3.2 | 120 | 6.9 |
| 8 | a | internal side | 1200 | 38 | 2.4 | 800 | 40 | 2.4 | 700 | 42 | 3.2 | 600 | 42 | 3.2 | 170 | 4.7 |
|   |   | external side | 1200 | 38 | 4.0 | 1050 | 40 | 4.0 | 900 | 42 | 4.0 | 700 | 42 | 4.0 | 165 | 5.6 |
| 9 | b | internal side | 1250 | 35 | 2.4 | 1000 | 40 | 2.4 | 700 | 42 | 3.2 | 600 | 42 | 3.2 | 170 | 4.9 |
|   |   | external side | 1200 | 38 | 2.4 | 800 | 40 | 2.4 | 700 | 42 | 3.2 | 600 | 42 | 3.2 | 110 | 7.2 |
| 10 | c | internal side | 1250 | 35 | 2.4 | 800 | 40 | 2.4 | 700 | 42 | 3.2 | 600 | 42 | 3.2 | 140 | 5.6 |
|    |   | external side | 1200 | 38 | 2.4 | 1000 | 40 | 2.4 | 700 | 42 | 3.2 | 600 | 42 | 3.2 | 95 | 8.9 |
| 11 | a | internal side | 1200 | 38 | 2.4 | 800 | 42 | 2.4 | 750 | 45 | 3.2 | 700 | 45 | 3.2 | 150 | 5.8 |
|    |   | external side | 1200 | 35 | 2.4 | 750 | 38 | 2.4 | 700 | 40 | 3.2 | 500 | 40 | 3.2 | 165 | 4.3 |
| 12 | b | internal side | 1200 | 38 | 2.4 | 900 | 45 | 2.4 | 800 | 45 | 3.2 | 700 | 45 | 3.2 | 160 | 5.8 |
|    |   | external side | 1200 | 38 | 2.4 | 900 | 45 | 2.4 | 800 | 45 | 3.2 | 700 | 45 | 3.2 | 90 | 10.2 |
| 13 | b | internal side | 1200 | 35 | 2.4 | 750 | 42 | 2.4 | 700 | 42 | 3.2 | 650 | 42 | 3.2 | 185 | 4.2 |
|    |   | external side | 1200 | 35 | 2.4 | 750 | 42 | 2.4 | 700 | 42 | 3.2 | 650 | 42 | 3.2 | 170 | 4.6 |

TABLE 6

| condition No | classification | $S_1/t^2$ | $S_2/t^2$ | $(S_1+S_2)/t^2$ | $W_1/t$ | $W_2/t$ | vE-30 (J) | presence/non-presence of defect | evaluation | remarks |
|---|---|---|---|---|---|---|---|---|---|---|
| 1 | internal side | 0.34 | 0.42 | 0.76 | 0.79 | 0.34 | 180 | no defect | ◎: extremely good | present invention example |
|   | external side |      |      |      | 0.94 | 0.37 | 122 |           |                    |                           |
| 2 | internal side | 0.35 | 0.39 | 0.74 | 0.80 | 0.35 | 164 | no defect | ◎: extremely good | present invention example |
|   | external side |      |      |      | 0.85 | 0.43 | 136 |           |                    |                           |
| 3 | internal side | 0.22 | 0.32 | 0.54 | 0.61 | 0.28 | 125 | no defect | ◎: extremely good | present invention example |
|   | external side |      |      |      | 0.79 | 0.32 | 148 |           |                    |                           |
| 4 | internal side | 0.24 | 0.33 | 0.57 | 0.67 | 0.29 | 173 | no defect | ◎: extremely good | present invention example |
|   | external side |      |      |      | 0.80 | 0.32 | 134 |           |                    |                           |
| 5 | internal side | 0.21 | 0.28 | 0.49 | 0.62 | 0.26 | 114 | no defect | ◎: extremely good | present invention example |
|   | external side |      |      |      | 0.76 | 0.29 | 230 |           |                    |                           |
| 6 | internal side | 0.22 | 0.23 | 0.45 | 0.68 | 0.27 | 202 | no defect | ◎: extremely good | present invention example |
|   | external side |      |      |      | 0.66 | 0.27 | 227 |           |                    |                           |
| 7 | internal side | 0.30 | 0.44 | 0.74 | 0.74 | 0.33 | 191 | no defect | ○: good | present invention example |
|   | external side |      |      |      | 0.97** | 0.37 | 68 |           |          |                           |
| 8 | internal side | 0.30 | 0.36 | 0.66 | 0.74 | 0.33 | 163 | no defect | ○: good | present invention example |
|   | external side |      |      |      | 0.82 | 0.47** | 77 |           |          |                           |
| 9 | internal side | 0.22 | 0.33 | 0.55 | 0.59** | 0.28 | 82 | no defect | ○: good | present invention example |
|   | external side |      |      |      | 0.80 | 0.32 | 176 |           |          |                           |
| 10 | internal side | 0.19 | 0.30 | 0.49 | 0.57** | 0.26 | 79 | no defect | ○: good | present invention example |
|    | external side |      |      |      | 0.80 | 0.30 | 163 |           |          |                           |
| 11 | internal side | 0.35 | 0.27 | 0.62 | 0.78 | 0.35 | 191 | no defect | ○: good | present invention example |
|    | external side |      |      |      | 0.58** | 0.33 | 70 |           |          |                           |
| 12 | internal side | 0.25 | 0.47* | 0.72 | 0.70 | 0.31 | 110 | no defect | X: bad | comparison example |
|    | external side |      |      |      | 0.96** | 0.38 | 26 |           |         |                           |
| 13 | internal side | 0.18 | 0.21 | 0.39* | 0.59** | 0.24 | 212 | lack of penetration | X: bad | comparison example |
|    | external side |      |      |      | 0.72 | 0.27 | 155 |           |         |                           |

Note 1:
symbol * indicating outside the scope of the present invention symbol
** indicating outside the scope of the present invention
Note 2:
$W_1$: bead width measured on surface of steel plate (mm)
$W_2$: bead width measured at depth of 0.4t (t: plate thickness) in plate thickness direction from surface of steel plate (mm)
Note 3: vE-30 (J): upper stage: test value of internal side, lower stage: test value of external side (average value of three tests) Test condition: test temperature: −30° C., location of notch: Fusion Line
Note 4: evaluation: ◎: extremely good, ○: good, X: bad

The invention claimed is:

1. A submerged arc welding method for a steel plate wherein, in performing internal-and-external one layer welding on a steel plate by submerged arc welding, a sum of a cross-sectional area of internal weld metal $S_1$ and a cross-sectional area of external weld metal $S_2$ satisfies the formula (1), the cross-sectional area of the internal weld metal $S_1$ satisfies the formula (2), and the cross-sectional area of the external weld metal $S_2$ satisfies the formula (3);

$$0.40 \leq (S_1 + S_2)/t^2 \leq 0.80 \tag{1}$$

$$S_1/t^2 \leq 0.35 \tag{2}$$

$$S_2/t^2 \leq 0.45 \tag{3},$$

wherein t is a plate thickness of the steel plate (mm), $S_1$ is a cross-sectional area of the internal weld metal (mm²) excluding a cross-sectional area of a portion of the internal weld metal overlapping with external weld metal after external welding, and $S_s$ is a cross-sectional area of the external weld metal (mm²).

2. The submerged arc welding method for a steel plate according to claim 1, wherein in both the internal welding and the external welding, a bead width measured on a surface of the steel plate satisfies the formula (4), and a bead width measured at a depth of 0.4 t from the surface of the steel plate satisfies the formula (5);

$$0.60 \leq W_1/t \leq 0.95 \tag{4},$$

wherein t is the plate thickness (mm), $W_1$ is a bead width measured on the surfaces of the steel plate on the internal welding side and the external welding side (mm), $$W_2/t \leq 0.45 \tag{5},$$

wherein, t is the plate thickness (mm), $W_2$ is a bead width measured at a position of 0.4 t in the plate thickness direction from the surfaces of the steel plate on the internal welding side and the external welding side (mm).

3. A weld joint manufactured by the welding method according to claim 1.

4. A submerged arc welding method for a steel plate which performs internal-and-external one layer welding on a steel plate, wherein in both the internal welding and the external welding, a bead width measured on a surface of the steel plate satisfies the formula (4), and a bead width measured at a depth of 0.4 t from the surface of the steel plate satisfies the formula (5);

$$0.60 \leq W_1/t \leq 0.95 \tag{4},$$

wherein t is a plate thickness (mm), $W_1$ is a bead width measured on the surfaces of the steel plate on the internal welding side and the external welding side (mm), $$W_2/t \leq 0.45 \tag{5},$$

wherein t is a plate thickness (mm), $W_2$ is a bead width measured at a position of 0.4 t in the plate thickness direction from the surfaces of the steel plate on the internal welding side and the external welding side (mm).

5. A weld joint manufactured by the welding method according to claim 4.

6. A steel pipe having a weld joint manufactured by internal-and-external one layer welding on a steel plate by submerged arc welding, wherein a sum of a cross-sectional area of internal weld metal $S_1$ and a cross-sectional area of external weld metal $S_2$ satisfies the formula (1), the cross-sectional area of the internal weld metal $S_1$ satisfies the formula (2), and the cross-sectional area of the external weld metal $S_2$ satisfies the formula (3);

$$0.40 \leq (S_1 + S_2)/t^2 \leq 0.80 \tag{1}$$

$$S_1/t^2 \leq 0.35 \tag{2}$$

$$S_2/t^2 \leq 0.45 \tag{3},$$

wherein t is a plate thickness of the steel plate (mm), $S_1$ is a cross-sectional area of the internal weld metal (mm²) excluding a cross-sectional area of a portion of the internal weld metal overlapping with external weld metal after external welding, and $S_s$ is a cross-sectional area of the external weld metal (mm²).

7. A steel pipe having a weld joint manufactured by internal-and-external one layer welding on a steel plate by submerged arc welding, wherein in both the internal weldment and the external weldment, a bead width measured on a surface of the steel plate satisfies the formula (4), and a bead width measured at a depth of 0.4 t from the surface of the steel plate satisfies the formula (5);

$$0.60 \leq W_1/t \leq 0.95 \tag{4},$$

wherein t is a plate thickness (mm), $W_1$ is a bead width measured on the surfaces of the steel plate on the internal welding side and the external welding side (mm), $$W_2/t \leq 0.45 \tag{5},$$

wherein t is a plate thickness (mm), $W_2$ is a bead width measured at a position of 0.4 t in the plate thickness direction from the surfaces of the steel plate on the internal welding side and the external welding side (mm).

* * * * *